United States Patent
Walker et al.

(10) Patent No.: US 8,630,916 B2
(45) Date of Patent: Jan. 14, 2014

(54) SYSTEM AND METHOD FOR ENCOURAGING COMPETITIVE PARTICIPATION IN AN AUCTION

(75) Inventors: Jay S. Walker, Ridgefield, CT (US); Andrew S. Van Luchene, Norwalk, CT (US); Daniel E. Tedesco, New Canaan, CT (US)

(73) Assignee: Inventor Holdings, LLC, Stamford, CT (US)

( * ) Notice: Subject to any disclaimer, the term of this patent is extended or adjusted under 35 U.S.C. 154(b) by 1684 days.

(21) Appl. No.: 11/456,245

(22) Filed: Jul. 10, 2006

(65) Prior Publication Data

US 2006/0242056 A1 Oct. 26, 2006

Related U.S. Application Data

(63) Continuation of application No. 09/223,901, filed on Dec. 31, 1998.

(51) Int. Cl.
*G06Q 99/00* (2006.01)

(52) U.S. Cl.
USPC ...... 705/26.3; 705/26.1; 705/14.1; 705/14.71

(58) Field of Classification Search
USPC ................ 705/37, 26, 26.3, 26.1, 14.1, 14.71
See application file for complete search history.

(56) References Cited

U.S. PATENT DOCUMENTS

| | | | |
|---|---|---|---|
| 4,491,725 A | 1/1985 | Pritchard | |
| 4,667,292 A | 5/1987 | Mohlenbrock et al. | |
| 4,750,119 A | 6/1988 | Cohen et al. | |
| 4,789,928 A | 12/1988 | Fujisaki | |
| 4,799,156 A | 1/1989 | Shavit et al. | |
| 4,833,308 A | 5/1989 | Humble | |
| 4,903,201 A | 2/1990 | Wagner | |
| 4,982,346 A | 1/1991 | Girouard et al. | |
| 5,025,372 A | 6/1991 | Burton et al. | |
| 5,076,588 A * | 12/1991 | Minh | 273/292 |
| 5,173,851 A | 12/1992 | Off et al. | |
| 5,200,890 A | 4/1993 | Pionchon | |
| RE34,380 E | 9/1993 | Sleevi | |
| 5,287,268 A | 2/1994 | McCarthy | |
| 5,297,026 A | 3/1994 | Hoffman | |

(Continued)

FOREIGN PATENT DOCUMENTS

| | | |
|---|---|---|
| EP | 0 388 162 | 9/1990 |
| EP | 0 411 748 A2 | 2/1991 |

(Continued)

OTHER PUBLICATIONS

Office Action for U.S. Appl. No. 11/456,241 mailed Jan. 11, 2008, 13 pp.

(Continued)

*Primary Examiner* — Akiba Allen
(74) *Attorney, Agent, or Firm* — Fincham Downs, LLC; Carson C. K. Fincham

(57) ABSTRACT

In both an on-line and a conventional auction, an auctioneer may encourage competitive bidding behavior through the provision of rewards to those bidders whose bids meet predetermined criteria. For example, a bidder may be rewarded if her bid exceeds a prior bid by a threshold value. An auctioneer may further discourage non-competitive bidding behavior by penalizing those bidders whose bids fall below predetermined standards.

29 Claims, 11 Drawing Sheets

| AUCTION ID 600 | REQUIRED CONDITIONS 602 | OFFER MESSAGE 604 | OFFER RECIPIENT RULES 606 | REWARD ID 608 |
|---|---|---|---|---|
| 123 | NO BIDS RECEIVED WITHIN 30 MINUTES | "MAKE THE NEXT BID AND WE'LL GIVE YOU A $10 REBATE CREDITED TO YOUR FINANCIAL ACCOUNT" | ALL PARTICIPANTS IN CURRENT AUCTION DATABASE | 28 |
| 123,124 | HIGH BID < $300.00 AFTER 3RD HOUR OF AUCTION | "MAKE THE NEXT BID AND WE'LL GIVE YOU $15 TOWARDS THE NEXT BID THEREAFTER" | TOP 5 BIDDERS IN CURRENT AUCTION DATABASE | 21 |
| 124 | HIGH BID < $450.00 | "MAKE THE NEXT BID OVER $500 AND WE'LL GIVE YOU A FREE CLOCK-RADIO" | FIRST BIDDER | 26 |

(56) References Cited

U.S. PATENT DOCUMENTS

| | | | |
|---|---|---|---|
| 5,319,542 A | 6/1994 | King, Jr. et al. | |
| 5,333,186 A | 7/1994 | Gupta | |
| 5,380,991 A | 1/1995 | Valencia et al. | |
| 5,420,606 A | 5/1995 | Begum et al. | |
| 5,515,270 A | 5/1996 | Weinblatt | |
| 5,537,314 A | 7/1996 | Kanter | |
| 5,619,558 A | 4/1997 | Jheeta | |
| 5,636,346 A | 6/1997 | Saxe | |
| 5,652,784 A | 7/1997 | Blen et al. | |
| 5,687,322 A | 11/1997 | Deaton et al. | |
| 5,694,551 A | 12/1997 | Doyle et al. | |
| 5,710,884 A | 1/1998 | Dedrick | |
| 5,715,402 A | 2/1998 | Popolo | |
| 5,717,860 A | 2/1998 | Graber et al. | |
| 5,721,827 A | 2/1998 | Logan et al. | |
| 5,724,521 A | 3/1998 | Dedrick | |
| 5,727,153 A | 3/1998 | Powell | |
| 5,734,838 A | 3/1998 | Robinson et al. | |
| 5,752,238 A | 5/1998 | Dedrick | |
| 5,761,648 A | 6/1998 | Golden | |
| 5,770,533 A | 6/1998 | Franchi | |
| 5,774,868 A | 6/1998 | Cragun et al. | |
| 5,794,210 A | 8/1998 | Goldhaber et al. | |
| 5,794,219 A | 8/1998 | Brown | |
| 5,794,220 A | 8/1998 | Hunt | |
| 5,794,221 A | 8/1998 | Egendorf | |
| 5,806,044 A | 9/1998 | Powell | |
| 5,812,769 A | 9/1998 | Graber et al. | |
| 5,819,092 A | 10/1998 | Ferguson et al. | |
| 5,822,736 A | 10/1998 | Hartman et al. | |
| 5,826,244 A | 10/1998 | Huberman | |
| 5,835,896 A | 11/1998 | Fisher et al. | |
| 5,839,119 A | 11/1998 | Krsul et al. | |
| 5,855,008 A | 12/1998 | Goldhaber et al. | |
| 5,857,175 A | 1/1999 | Day et al. | |
| 5,864,822 A | 1/1999 | Baker, III | |
| 5,870,030 A | 2/1999 | DeLuca et al. | |
| 5,873,068 A | 2/1999 | Beaumont et al. | |
| 5,873,069 A | 2/1999 | Reuhl et al. | |
| 5,884,292 A | 3/1999 | Baker et al. | |
| 5,890,135 A | 3/1999 | Powell | |
| 5,923,016 A | 7/1999 | Fredregill et al. | |
| 5,970,143 A * | 10/1999 | Schneier et al. | 713/181 |
| 5,974,398 A | 10/1999 | Hanson | |
| 6,012,045 A * | 1/2000 | Barzilai et al. | 705/37 |
| 6,047,274 A * | 4/2000 | Johnson et al. | 705/412 |
| 6,049,778 A | 4/2000 | Walker et al. | |
| 6,108,639 A | 8/2000 | Walker et al. | |
| 6,243,691 B1 * | 6/2001 | Fisher et al. | 705/37 |
| 6,363,365 B1 | 3/2002 | Kou | |
| 7,870,055 B2 * | 1/2011 | Fisher et al. | 705/37 |
| 2003/0009379 A1 * | 1/2003 | Narasimhan et al. | 705/14 |
| 2006/0211477 A1 * | 9/2006 | Walker et al. | 463/16 |
| 2008/0162330 A1 * | 7/2008 | Atkinson et al. | 705/37 |
| 2010/0004986 A1 * | 1/2010 | Walker et al. | 705/14.11 |

FOREIGN PATENT DOCUMENTS

| | | |
|---|---|---|
| WO | WO 96/31848 | 10/1996 |
| WO | WO 98/06050 | 2/1998 |
| WO | WO 98/38562 | 3/1998 |
| WO | WO 98/26363 | 6/1998 |
| WO | WO 98/28699 A1 | 7/1998 |
| WO | WO 98/34187 | 8/1998 |
| WO | WO 00/21004 A1 | 4/2000 |

OTHER PUBLICATIONS

Office Action for U.S. Appl. No. 09/223,901 mailed Jan. 17, 2008, 25 pp.
Office Action for U.S. Appl. No. 09/223,901 mailed Aug. 10, 2007, 23 pp.
Office Action for U.S. Appl. No. 09/223,901 mailed Oct. 16, 2006, 22 pp.
Office Action for U.S. Appl. No. 09/223,901 mailed Feb. 27, 2006, 22 pp.
Office Action for U.S. Appl. No. 09/223,901 mailed Jan. 11, 2005, 25 pp.
Office Action for U.S. Appl. No. 09/223,901 mailed May 27, 2004, 22 pp.
Office Action for U.S. Appl. No. 09/223,901 mailed Jan. 14, 2003, 16 pp.
Office Action for U.S. Appl. No. 09/223,901 mailed Apr. 17, 2002, 13 pp.
Office Action for U.S. Appl. No. 09/223,901 mailed Jul. 10, 2001, 15 pp.
Office Action for U.S. Appl. No. 09/223,901 mailed Nov. 30, 2000, 12 pp.
Netis and Gilmore Auctions, (http://www.auctionweb.com), Copyright 1995-1998, 8pp.
"ebay Frequently Asked Questions," (http://pages.ebay.com), Copyright 1995-1998, 16pp.
"HP Pavilion 6350 w/AMD K6-2 333, 64MB, 8.0GB HD, 24X CD, 56K," Onsale Website, (http://onsale.com), Copyright 1998, 17 pp.
"DealDeal.com—The Best Auction Deals on the . . . ," (http://www.dealdeal.com), Copyright 1997, 1998, 2pp.
"PCT International Search Report" for PCT/US99/19955 dated Feb. 23, 2000, 6pp.
M.Kumar et al., "Internet Auctions", Proceedings of the $3^{rd}$. Usenix Workshop on Electronic Commerce; Aug. 31-Sep. 3, 1998, 12pp.
"PCT International Search Report" for Application No. PCT/US99/23901, Feb. 28, 2000, 7pp.
Rozen, Miriam, "What's New in Joint Promotions", The New York Times, p. 23, Mar. 10, 1985, 1pg.
Katcher, P. Royall, "Getting products to consumers; The Basics of Retailing, Part 2"; Automotive Marketing, vol. 19; No. 5; p. 34; ISSN: 0193-3264; May 1990, 5pp.
Booker, Ellis, CW (Computerworld) staff, "Checkout lines to offer more than jus candy and waiting", Computerworld, PC's & Workstations; p. 47; May 21, 1990, 1pg.
Shaw, Robert, "How the Smart Card is Changing Retailing"; Long Range Planning, vol. 24, No. 1, pp. 111-114, Feb. 1991, 4pp.
"Checkstands Boost Supermarket Profits", Chain Store Age Executive, Checkstand Design and Productivity, p. 158, Dec. 1991, 2pp.
Pogoda, Dianne M., "G.E.C.C. offers credit card with discounts, rebates; General Electric Capital Corp.; Brief Article"; WWD (Women's Wear Daily); vol. 164; No. 46; p. 7; ISSN: 0149-5380, Sep. 3, 1992, 2pp.
Untitled Article, Aug. 31, 1994, Communications Daily, Warren Publishing, Inc., vol. 14., No. 169, 1pg.
"New telecommunications players as PCS spectrum auction closes", May 26, 1998, M2 Presswire, 4pp.
"Telecoms: Nextel and Intek Vie at FCC Wireless Auction", M2 Presswire, Sep. 17, 1998, 1pg.
"Budget Leaves Out Spectrum Fee", Feb. 13, 1995, Television Digest, Warren Publishing, Inc., vol. 35, No. 7, 2pp.
Beraldi, "Efficient parallel algorithms for the minimum cost flow problem", Journal of Optimization Theory and Applications, Plenum Publishing, Dec. 1997, vol. 95, No. 3, 1pg.
"FCC Takes Spectrum Exemption Away from Public Safety Firms", Mar. 16, 1994, 4pp.
Set-top 'Converger'; Interactive Initiatives Abound at NCTA Convention; Communications Daily, vol. 13, No. 111; p 9; Jun. 10, 1993, 2pp.
Mandese, Joe, "Interactive puts radio at crossroads; Out-of-home role, tapping into digital tech could ensure future", Advertising age, News; p. 12, Oct. 25, 1993, 3pp.
Kristoff, Kathy, Los Angeles Times Syndicate, "Card Sharks Are in Season, Be Wary of Discounts and Rebates as You Shop for Good Credit Deals"; Chicago Tribune; Your Money; p. 9; Zone C; Personal Finance; North Sports Final Edition; Nov. 23, 1993, 2pp.
Rosenberg, Joyce M. "GE Capital Comes to Macy's Aid Again"; AP (Associated Press) Worldstream; Financial Pages; Feb. 17, 1994, 2pp.
Ellis, Stephan, "Credit card firms drive down costs"; Sunday Times; Features Section; Feb. 27, 1994, 4pp.

(56) References Cited

OTHER PUBLICATIONS

Patch, Kimberly, "Sled InterNIC debut Internet Services; Led Corp offers electronic coupons for encryption software; InterNIC Information Services Luanches InfoGuide to Internet Computer Network; News Digest; Brief Article; Product Announcement"; PC week, vol. 11; No. 19; p. 130; ISSN: 0740-2604, May 16, 1994, 1pg.

Ratcliffe, Mitch, "Lucie; interactive information, advertising stands upright, prepares to walk; Information Presentation Technologies Inc's Local Use Consumer Interactive Environment"; Digital Media, No. 1, vol. 4; p. 14; ISSN: 1056-7038; Jun. 8, 1994, 4pp.

Armstrong, Larry, in Arcadia, California "Coupons Clippers, Save Your Scissors", Business Week, Information Processing; Jun. 20, 1994, 2pp.

Bowles, Bob; Andreasen, Lois. "ADSI: maximizing the synergy between the network and terminals; analog display services interface"; Telephony, p. 20, Aug. 29, 1994, 4pp.

Block, Valerie, "GM Turns Up the Heat With Plan to Cross-Sell Some Financial Products"; The American Banker; p. 16, Nov. 18, 1994, 2pp.

Wildstrom, Stephen H., "Pagers That Can Spell It All Out";, Business Week; Technology and You; p. 16, Jan. 16, 1995, 2pp.

Ratcliffe, Mitch, "All roads lead to Microsoft's 'Windows everywhere' strategy"; Digital Media, p. 2. ISSN: 1056-7038; Mar. 6, 1995, 11pp.

Meece, Mickey, "Big Finance Companies May Want Piece of Limited's Private-Label Card Program", The American Banker, p. 8, Apr. 12, 1995, 2pp.

Schrage, Michael, "Free stuff! Predatory Pricing or creative cross-promotion? You be the Judge; The Beta Version; Industry Trend or Event; Column", Information Access Company, a Thompson Corporation Company, p. 24, ISSN:0805-5697, Oct. 1995, 2pp.

Various telecommunications-related articles in Communications Daily; vol. 16, No. 95, p. 4, May 15, 1996, 3pp.

Marshall, Kyle, "More phone choices ring in", The News and Observer, (Raleigh, NC); p. D1, Aug. 13, 1996, 2pp.

Nolle, Tom, Overcoming Cellular déjà vu; personal communications services; America's Network, p. 70, ISSN: 1075-5292, Sep. 15, 1996; IAC-create date: Jan. 24, 1999, 6pp.

Meece, Mickey, "MasterCard, Retailers Testing Point of Sale Discounts Program", p. 14; Sep. 24, 1996, 1pg.

"Battle of the bogoff: Roderick Oram on a clash between retailers and manufacturers", Financial Times (London), p. 14, Oct. 24, 1996, Thursday London Edition, 2pp.

Wessel, Harry, Orland Sentinel, "Rewarding Experience?; Credit Cards Offering Bonuses Not for Everyone", Chicago Tribune; Your Money; p. 1, Nov. 4, 1996, 3pp.

"AT&T Wireless adds convenience to buying cellular service", M2 Communications Ltd. 1996; M2 Presswire; Nov. 20, 1996, 2pp.

Selasky, Susan, Detroit Free Press, "Easy-To-Swallow Savings; Dinner Credit Cards Serve Wide Menu of Discounts"; Pittsburgh Post-Gazette; p. F-2; Dec. 5, 1996, 3pp.

"Merger Creates Alliance Data"; Credit Risk Management Report; vol. 6, No. 25; Dec. 16, 1996, 1pg.

"SNET Cellular Value Plans"; SNET Digital Value Plans; SNET Price Plans brochure, Copyright 1998, 4pp.

Higgins, Stephen. "Digital phone service on the way"; Ingersoll Publications Co. 1997; Business Dateline; New Haven Register; p. D1, Jan. 7, 1997, 3pp.

Beyer, Leslie, "Target marketing made easy; supermarkets"; Delta Communications Inc., Grocery Marketing; p. 45; ISSN: 0888-0360; Feb. 1997, 3pp.

Kerstetter, Jim, "E-Commerce updates get intelligent agents; electronic commerce; Brief Article Product Announcement"; Information Access Company, a Thomson Corporation Company; PC Week; p. 6; ISSN: 0740-1604, Feb. 3, 1997, 2pp.

Warner, Bernhard, "Ads in the Ether on PCS, Phones, Pagers (Will customers accept promo beeps?)"; Brandweek; Pf. 48, Mar. 31, 1997. (http://www.brandweek.com), 3pp.

Barlow, Rick, "Relationship Marketing: Coalition Marketing is Coming Back"; Brandweek formerly Adweek Marketing Week; Apr. 28, 1997, 2pp.

"Emaginet Plans to 'Push' its Way into Consumer Mindset Pocketbook"; Interactive PR and Marketing News; vol. 4, No. 22; May 30, 1997, 2pp.

Gilligan, Gregory, "Credit Cards From Retail Stores a Mixed Blessing for Shoppers"; The Richmond Times Dispatch; p. E-1; City Edition; Jul. 20, 1997, 4pp.

Simon, Ruth, "Make Sure Your Rebate Card Still Delivers the Goods"; The Time Inc. Magazine Company; Money; Your Money Monitor; p. 42; Aug. 1997, 2pp.

Williams, Martyn, "Internet Update" (This is a roundup of new and updated resources and services on the global internet); Post-Newsweek Business Information Inc.; Newsbytes; Aug. 4, 1997, 3pp.

Fitzgerald, Beth, "New Jersey-Based SCA Helps Private Label Credit Cards Take Off"; The Star Ledger; Kr-Acc-No: 19970804000025; Aug. 4, 1997, 3pp.

Sanders, Edmund, Orange County Register; "Tricky Business; The Magic of Rebate Cards Can Quickly Dissappear"; Chicago Tribune; North Sports Final Edition; Your Money; p. 1, Zone:C; Aug. 18, 1997, 3pp.

Wijnen, Renee, "Cendant Eyes Cross-Marketing Opportunities; CUC International-HFS Inc. merger expected to yield an additional 2 million club members", DM News, p. 4, Feb. 2, 1998, 2pp.

"Cardholders think big"; Bank Marketing International; Survey; p. 8; Mar. 1998, 3pp.

Wald, Matthew L., "Spending It; Untying Cellular Phones From Those Annual Contracts"; The New York Times; Section 3; p. 10; col. 2; Money and Business Financial Desk; Mar. 15, 1998, 2pp.

"American Eagle Outfitters, Inc Introduces the First Clear Credit Card"; PR Newswire; Financial News, Warrendale, Pa., Mar. 26, 1998. 1pg.

Teh Hooi Ling, "Prices of handphones dive, thanks to cross-subsidies"; Business Times (Singapore); p. 1; Apr. 8, 1998, 2pp.

"Card Briefs: Beneficial Casual Male Team Up on Card"; The American Banker; Cards; p. 20; May 4, 1998, 1pg.

"Points Earn Little Credit AAS Carholders Fail to Cash in"; Birmingham (England) Post, p. 32; May 9, 1998, 2pp.

"Jay Jacobs Inc. Introduces Private Label Credit Card"; Business Wire; Seattle, WA; May 18, 1998, 1pg.

"Wells Park Group Launches 'V.I.P. Rewards'; the Most Comprehensive Relationship Marketing Program Ever Created by a Mall Developer"; Business Wire, May 19, 1998, 2pp.

"Shoppers Charge Accounts Co. to Administer Private Label Credit Card for Lew Magram, Ltd.; Program Marks SCA's Entry into Retail Catalog/Mail Order Industry"; PR Newswire; Financial News; Mahwah N.J.; Jun. 29, 1998, 2pp.

Quittner, Joshua, "Cell Phones At 7-11? Almost everyone is selling wireless service these days. Here's how to get the right deal"; Time; p. 95; Jul. 6, 1998, 2pp.

Cruz, Humberto, "The Savings Game. Read fine print in rebate offers by credit cards"; The Cincinnati Enquirer; p. B16; Aug. 31, 1998, 3pp.

"Take 5 minutes to open an account now and take 10% off your purchase today"; Photocopy of Macy's Membership Application, 1998, 3pp.

Photocopy of Filene's Credit Card Application; Sep. 1998, 3pp.

Bloom, Jennifer Kingson, "Wal-Mart on Retail Road Less Traveled: Cobranding"; The American Banker; Card Section; Sep. 11, 1998, 3pp.

Elkin, Toby, "Promotions: MasterCard Wins Coveted On-Pack Real Estate In Tie-in with Microsoft"; Brandweek, formerly Adweek Marketing Week; Sep. 14, 1998, 1pg.

Sinclair, Stewart, "To mail or not to mail", Strategy Direct Response Special Report; p. D-21; Oct. 12, 1998, 4pp.

"Microsoft and First USA Announce $90 Million Advertising Alliance for MSN; First USA to Become Exclusive Credit Card Advertiser Across Most of MSN in the Largest Internet Advertising Deal"; PR Newswire; Financial News; Redmond, Washington., Oct. 28, 1998, 2pp.

(56) References Cited

OTHER PUBLICATIONS

Griffin, Kate, "Issuers Charge Ahead to Focus on Price vs. Brand"; Card Marketing; vol. 2, No. 10; Nov. 1998. (http://cardmarketing.faulknergray.com), 2pp.

"Retail Cards: Attention Kmart Card Holders: 6% Back is Dead a New Package is Coming"; Credit Card News; Nov. 1, 1998, 3pp.

"Competition: First USA, With Its Microsoft Pact, Is King of the Internet"; Credit Card News; Nov. 1, 1998, 2pp.

Feldman, Amy, "Paying With Plastic Not Such Smart Idea"; From: News and Views/Media and Business; Nov. 4, 1998, 2pp.

Cowell, Allan, "America's Turn to Colonize; CreditCard Issuers Invade Britain, With U.S. Firepower"; The New York Times; Section C; p. 1; Nov. 12, 1998, 5pp.

"#1 Online Department Store Joins ClickRewards in Time for the Holidays; Azazz.com to Supply Name-brand Merchandise for Netcentives' ClickRewards Catalog and ClickRewards; Members Can Now Earn Generous ClickMiles Promotions Within The Azazz.com Internet Department Store"; PR Newswire; Nov. 27 1998, 3pp.

Shermach, Kelly, "Partnerships Help Issuers Weave Web Concepts", Card Marketing; vol. 2, No. 11; Dec. 1998. (http://cardmarketing.faulknergray.com), 2pp.

"Largest Internet ad deal signed", Bank Marketing International; Feature: p. 7; Dec. 1998, 3pp.

"Amazon.com and Netflix.com Establish Promotional Relationship for the Sale and Rental of DVD Titles"; Business Wire; Dec. 4, 1998, 3pp.

Dennis, Sylvia, "Visa Gets Ready for Interactive Set-Top Boxes"; Newsbytes; Dec. 14, 1998, 2pp.

"At Sports Superstore Online, Shoppers Get More for Their Money; 10,000 Reasons to Shop at Sports Superstore Online"; Business Wire, Dec. 4, 1998, 2pp.

Korry, Elaine, San Francisco; Edwards, Bob, Washington DC, "Credit Card Enticements"; NPR Morning Edition (NPR 10:00 am ET); Transcript # 9812308-210; Dec. 23, 1998, 3pp.

E-Card Web Page, "E-Commerce Services From First USA"; Jan. 11, 1999. (http://apl.firstusa.com/pcard/index1.cfm?), 5pp.

"About SaveSmart"; SaveSmart.com; Copyright 1998. (http://www.savesmart.com/about/savesmart.html), 4pp.

"mySimon"; mySimon.com Fact Sheet; Copyright 1998. (http://mysimon.com/corporate/company/factsheet.html), 3pp.

"About ClickRewards the best way to earn miles"; ClickRewards.com; Copyright 1998. (http://www.clickrewards.com/about.html), 4pp.

"Alta Vista's special offer to you . . . $10 for any CD!"; Copyright 1995-1998, 1pg.

"Amazia Endeavor Travel"; Jun. 30, 1995, 2pp.

"Rent from NetFlix.com. Buy from Amazon.com" Official Press Release; Jan. 17, 1999 6:30 PM, 1pg.

Sprint Sense Anytime: Titanic on Videocassette is free when you sign up for Sprint Sense Day long distance; Jan. 18, 1999. (http://csg.sprint.com/titanic), 1pg.

Cox, Beth, "Visa, TravelWeb Enter Online Marketing Partnership"; internetnews.com; Jan. 21, 1999. (http://www.internetnews.com/ec-news/1999/01/2103-visa.html), 1pg.

Wijnen, Renee, "Listening to Ads Earns Free Long Distance; Advertisers select target groups to hear messages"; DM News; p. 1; Mar. 1, 1999, 3pp.

"Planet U; making promotional offers available to U"; May 23, 1999. (http://www.planetu.com/pages/con-index.html), Copyright 1998, 1999, 1pg.

"Five great reasons to enroll"; (http://www.coolsavings.com/scripts/whyenroll.asp?. . . ), copyright 1996-1999, 2pp.

"E-Centives"; May 23, 1999 (http://www.emaginet.com/de...memfaq.shtml), copyright 1998-1999, 3pp.

Visa—Smart Cards—About Smart Cards; "What is a Smart Card?" (http://www.visa.com/nt/chip/info.html); Copyright 1996-1999, 4pp.

"Smart Cards for Windows"; The Smart Card Market Opportunity; May 10, 1999. (http://www.microsoft.com/windowsce/smartcard/start/background.asp), 6pp.

"Our Cards: Smart Cards; Using Smart Cards to Deliver New Value"; MasterCard—The SmartCard: News & Views; Copyright 1994-2000, 5pp.

Poletti, Therese, "Latest Twist on Free PC's—Free iMacs"; Yahoo! News, Technology Headlines Aug. 3, 1999, (http://dailynews.yahoo.com/headlines/tc/story.html?), 2pp.

"Time", Inside: A Year of Free Time from Sprint®, 1999, 4pp.

Reina, Laura, "Another coupon competitor for the newspapers—Radio" Editor and Publisher, Dec. 2, 1995, 1pg.

\* cited by examiner

← 214

| AUCTION ID 400 | BIDDER ID 402 | BID AMOUNT 404 | TIME RECEIVED 406 |
|---|---|---|---|
| 123 | MALWG01B | $450.00 | 11:36 AM 1/1/99 |
| 123 | STEZD12K | $445.00 | 11:35 AM 1/1/99 |
| 123 | MCDT98R | $430.00 | 11:20 AM 1/1/99 |
| 123 | SMIMW19B | $350.00 | 10:15 AM 1/1/99 |
| 123 | ROBX12B | $336.00 | 9:47 AM 1/1/99 |
| 123 | JONEX84B | $195.00 | 9:24 AM 1/1/99 |
| 123 | SMIMW19B | $150.00 | 9:12 AM 1/1/99 |
| 123 | DOEQ29J | $135.00 | 9:10 AM 1/1/99 |

FIG. 4

| BIDDER ID 500 | HISTORIC PARTICIPATION LEVEL 502 | BIDDER NAME 504 | FINANCIAL ACCOUNT IDENTIFIER 506 | CONTACT INFORMATION 508 |
|---|---|---|---|---|
| DOEQ29J | 5 | JOHN DOE | 1234-1234-1234-1234 | 12 WILLOW ST. TOWN, STATE |
| ROBX12B | 2 | BOB ROBERTS | 1111-1111-1111-1111 | 500 1ST AVE. CITY, STATE |
| MCDT98R | 8 | SUE McDONALD | 9999-9999-9999-9999 | 222 PARK AVE. CITY, STATE |
| JONEX84B | 3 | TOM JONES | 5555-5555-5555-5555 | 15 RIVER PL. TOWN, STATE |
| SM1MW19B | 10 | BILL SMITH | 2222-2222-2222-2222 | 192 BARN RD. TOWN, STATE |
| MALWG01B | 1 | NEIL MALLONE | 4444-4444-4444-4444 | 95 MAIN ST. TOWN, STATE |
| MARYZ02C | 21 | ANDREW MARTIN | 3333-3333-3333-3333 | 5 PARK AVE. CITY, STATE |
| STEZD12K | 6 | STEVE JOHNSON | 7777-7777-7777-7777 | 8 PROSPECT ST. TOWN, STATE |

| AUCTION ID 600 | REQUIRED CONDITIONS 602 | OFFER MESSAGE 604 | OFFER RECIPIENT RULES 606 | REWARD ID 608 |
|---|---|---|---|---|
| 123 | NO BIDS RECEIVED WITHIN 30 MINUTES | "MAKE THE NEXT BID AND WE'LL GIVE YOU A $10 REBATE CREDITED TO YOUR FINANCIAL ACCOUNT" | ALL PARTICIPANTS IN CURRENT AUCTION DATABASE | 28 |
| 123,124 | HIGH BID < $300.00 AFTER 3RD HOUR OF AUCTION | "MAKE THE NEXT BID AND WE'LL GIVE YOU $15 TOWARDS THE NEXT BID THEREAFTER" | TOP 5 BIDDERS IN CURRENT AUCTION DATABASE | 21 |
| 124 | HIGH BID < $450.00 | "MAKE THE NEXT BID OVER $500 AND WE'LL GIVE YOU A FREE CLOCK-RADIO" | FIRST BIDDER | 26 |

FIG. 6

| REWARD IDENTIFIER 700 | REWARD SUPPLIER 702 | REWARD DESCRIPTION 704 | REWARD RULES 706 |
|---|---|---|---|
| 21 | AUCTIONEER | $15.00 TOWARD SUBSEQUENT BID | - AUCTIONED PRODUCT = PRODUCT X<br>- BIDDER MUST EXCEED CURRENT HIGH BID |
| 22 | THIRD PARTY | $50 TOWARDS OFFER | - AUCTIONED PRODUCT = PRODUCT Y<br>- BIDDER MUST AGREE TO USE THIRD PARTY INSURER IF THEY ARE THE WINNING BIDDER |
| 23 | AUCTIONEER | WARRANTEE ON AUCTION PRODUCT | - AUCTIONED PRODUCT = PRODUCT Z<br>- BIDDER MUST SUBMIT > 5 BIDS IN CURRENT AUCTION |
| 24 | AUCTIONEER | FREE DIGITAL WATCH | - AUCTIONED PRODUCT = PRODUCT B<br>- BIDDER MUST HAVE SUBMITTED AT LEAST 3 BIDS THAT PROGRESSIVELY INCREASED BY 50% |
| 25 | AUCTIONEER | $10.00 REBATE CREDITED TO FINANCIAL ACCOUNT | - BIDDER MUST HAVE RESPONDED TO HIGH BID WITH SUBSEQUENT BID WITHIN 2 MINUTES |
| 26 | AUCTIONEER | FREE CLOCK-RADIO | - BIDDER MUST HAVE BEEN THE FIRST BIDDER<br>- WINNING BID MUST BE ≥ $500.00 |
| 27 | AUCTIONEER | $50.00 GIFT CERTIFICATE TO RESTAURANT A | - BIDDER MUST HAVE PARTICIPATED IN ≥ 10 PREVIOUS AUCTIONS |
| 28 | AUCTIONEER | $10.00 REBATE CREDITED TO FINANCIAL ACCOUNT | - BIDDER MUST EXCEED CURRENT HIGH BID<br>- NO BID MUST HAVE BEEN PREVIOUSLY RECEIVED FOR 30 MINUTES AFTER THE PREVIOUS BID |

FIG. 7

SYSTEM AND METHOD FOR ENCOURAGING COMPETITIVE PARTICIPATION IN AN AUCTION

CROSS-REFERENCE TO RELATED APPLICATIONS

The present application is a continuation application of U.S. patent application Ser. No. 09/223,901, filed Dec. 31, 1998, entitled "METHOD AND APPARATUS FOR ENCOURAGING COMPETITIVE PARTICIPATION IN AN AUCTION"; which is incorporated by reference herein in its entirety.

This application is related to U.S. patent application Ser. No. 08/943,483 entitled "SYSTEM AND METHOD FOR FACILITATING ACCEPTANCE OF CONDITIONAL PURCHASE OFFERS (CPOs)" to Jay S. Walker, Daniel E. Tedesco, James A. Jorasch and Andrew S. Van Luchene filed on Oct. 3, 1997, the entirety of which is incorporated herein by reference.

This application is also related to U.S. patent application Ser. No. 11/456,241 filed Jul. 10, 2006, entitled "SYSTEM AND METHOD FOR ENCOURAGING COMPETITIVE PARTICIPATION IN AN AUCTION"; which is incorporated by reference herein in its entirety.

FIELD OF THE INVENTION

The present invention relates to auctions, and relates more particularly to systems and methods for rewarding or penalizing bidders whose bidding behavior during an auction session meets predetermined standards.

BACKGROUND OF THE INVENTION

Auctioning has been an accepted method for selling products and services since the early 1700's. Since that time, traditional auctions have been conducted in auction houses where bidders would gather and compete face-to-face for the purchase of a particular item. Such traditional auctions typically offer luxury items or antiques, whose prices command a large profit. Thus, only those persons who can afford such "high ticket" items participate in traditional auctions. Also, since most auction houses are located in large cities such as London or New York, traditional auctions usually attract only those persons living near or having the means to travel to these auction houses. Such auctions are further limited to those people who are willing to pay the price of admission to the auction house.

With the development of world-wide communications systems, auctions have evolved to include bidding via telephone and video-conferencing, thus overcoming the barrier imposed by travel. However, these auctions are still typically limited to high ticket items, thus attracting only a small proportion of the general public.

In recent years, and particularly with the advent of the Internet, auctioning has enjoyed increased attention and participation from the population at large. This is demonstrated by the success of such on-line Internet auctioning companies as EBAY and ONLINE.COM. These Internet auction companies allow for items of any value to be placed for bid on their web sites. Each item submitted for sale is assigned an auction session, which includes a starting time (or opening) and a closing time. Bids are then accepted electronically as long as the auction session is open. At the close of the auction session, the item is awarded to the highest bidder.

Although on-line auctioning has succeeded in attracting large-scale, daily participation in auctioning, the Internet environment has inadvertently eliminated some of the benefits enjoyed by traditional auctioning. For instance, the competitive bidding generated by face-to-face competition has been hampered, since on-line bidders usually are remotely located from each other. Furthermore, because the bidders in an on-line auction are not physically present at the auction site, they may not become instantly aware of higher bids submitted by other subsequent bidders.

Another drawback to on-line auctioning is the frequent submission of unreasonably low bids during an auction session. These bids are typically submitted by bidders who are not serious about obtaining the item being auctioned or who anticipate that no reasonable bids will be submitted. Such bidding behavior is a waste of an auctioneer's resources, since such unreasonable bids are rarely accepted. However, since there is no face-to-face interaction among on-line bidders, there is little incentive for a bidder to refrain from submitting unreasonably low bids.

Thus, a need exists to encourage competitive bidding and to discourage unreasonable bid submissions in an on-line auction environment.

SUMMARY OF THE INVENTION

Generally, according to the instant invention, systems and methods are disclosed for encouraging competitive bidding behavior during an auction session. Such systems and methods are advantageous in that they encourage competitive bidding by providing rewards to bidders whose bidding behavior meets predetermined criteria. Additionally, non-competitive bidding may be discouraged through the institution of penalties when bidding behavior falls below predetermined standards.

According to a first aspect of the present invention, a system and method for providing a reward to a bidder participating in an auction includes: identifying a product subject to bidding during an auction session; receiving a bid for the product from a bidder during the auction session; determining, based on a reward rule, whether the bidder is qualified to receive a reward; and if the bidder is qualified, transmitting, to the bidder, an indication that the bidder is qualified to receive the reward.

According to a second aspect of the present invention, a system and method for providing a penalty to a bidder participating in an auction includes: identifying a product subject to bidding during an auction session; receiving a bid for the product from a bidder during the auction session; determining, based on a penalty rule, whether the bidder is to receive a penalty; and if the bidder is to receive the penalty, transmitting, to the bidder, an indication that the bidder is to receive the penalty.

According to a third aspect of the present invention, a system and method for participating in an auction session includes: receiving an identification of a product subject to bidding during an auction session; transmitting a bid for the product to an auctioneer during the auction session; and receiving a reward in response to the bid.

According to a fourth aspect of the present invention, a system and method for participating in an auction session includes receiving an identification of a product subject to bidding during an auction session; transmitting a bid for the product to an auctioneer during the auction session; and receiving a penalty in response to the bid.

Further descriptions of the present invention are disclosed hereinbelow.

BRIEF DESCRIPTION OF THE DRAWINGS

A more complete understanding of the present invention, as well as further features and advantages thereof, will be obtained by reference to the following detailed descriptions when read in conjunction with the accompanying figures, of which:

FIG. 4 depicts an exemplary current auction database stored in the auction server of FIG. 1;

FIG. 5 is an exemplary bidder database stored in the auction server of FIG. 1;

FIG. 6 depicts an exemplary offer rules database stored in the auction server of FIG. 1;

FIG. 7 depicts an exemplary reward rules database stored in the auction server of FIG. 1;

DETAILED DESCRIPTION OF THE PREFERRED EMBODIMENTS

Definitions

The following words shall be construed to have the following meanings within the context of the present disclosure:

Auction: a public sale, conducted live or through an electronic network such as a telecommunications system or the Internet, in which products or services are sold to the highest bidder.

Bidder: a participant in an auction.

Buyer: the winning bidder in an auction.

High Bid: the bid provided by a bidder which currently exceeds the value of all other submitted bids.

Greatest Bid: the high bid at the close of the auction

Bid Spread: the difference in pecuniary value between two submitted bids.

Preferred Embodiments

Figure 1:
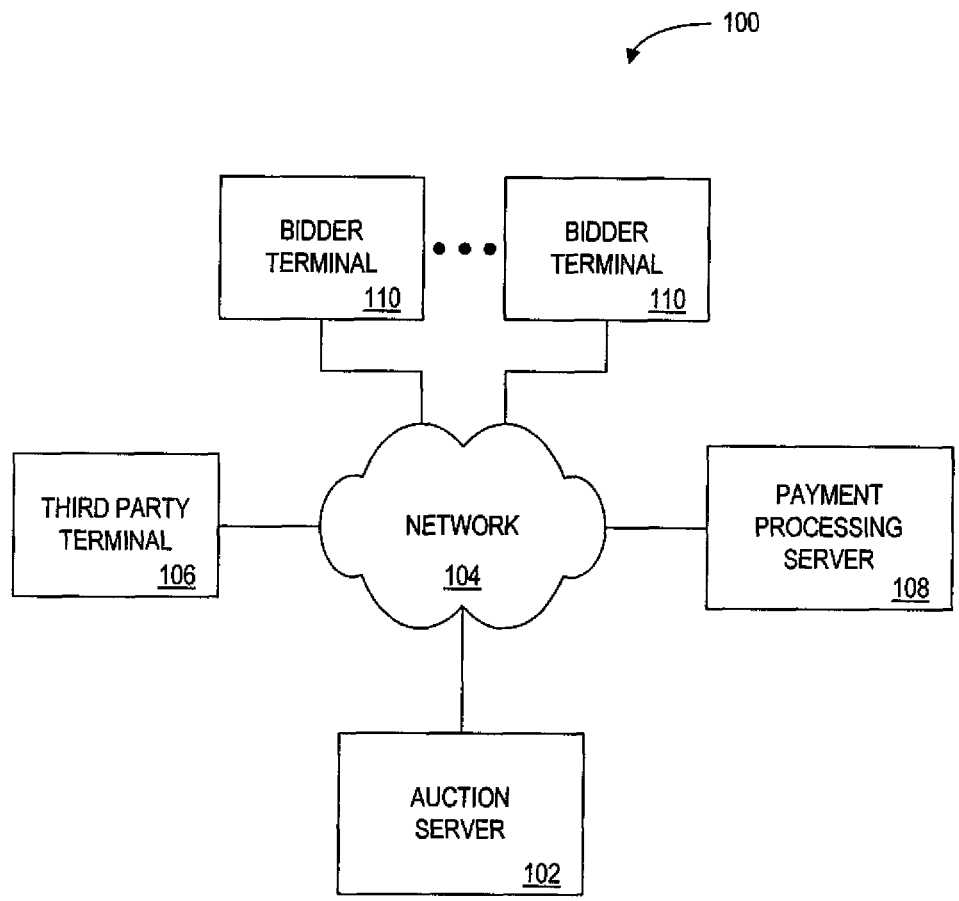
FIG. 1 is a block diagram illustrating a network over which an auction in accordance with the present invention may be conducted.

Referring now to FIG. 1, an on-line auction system 100 includes an auction server 102, a third party terminal 106, a payment processing server 108 and one or more bidder terminals 110, each connected through network 104. Auction server 102 is preferably operated by an on-line auctioneer, and may be any type of conventional computer or computing system that includes the components described below in reference to FIG. 2. Likewise, third party terminal 106, payment processor 108 and bidder terminals 110 may each be any conventional type of computer or computing system, such as an IBM personal computer or an IBM network server. Network 104 may be any type of network through which computers may communicate, such as a local-area network (LAN), a wide-area network (WAN), an intranet system, a public telephone exchange system, the Internet or any combination thereof.

Third party terminal 106 is preferably operated by a party other than the auctioneer or a bidder. A third party, in the present disclosure, offers a reward to qualified bidders participating in an auction held by the auctioneer, as discussed further below. Payment processor 108 is preferably operated by a financial clearinghouse, such as a credit card clearinghouse, which is equipped to process, inter alia, payments from the bidder to the auctioneer. Bidder terminals 110 are preferably operated by one or more bidders participating in an auction conducted through auction server 102.

It is to be understood that in an embodiment where the present invention is practiced in other than an on-line auction system, auction server 102, third party terminal 106, payment processing server 108 and/or bidder terminals 110 may be replaced by their respective operating parties, described above. In such case, network 104 may not be necessary.

Figure 2:
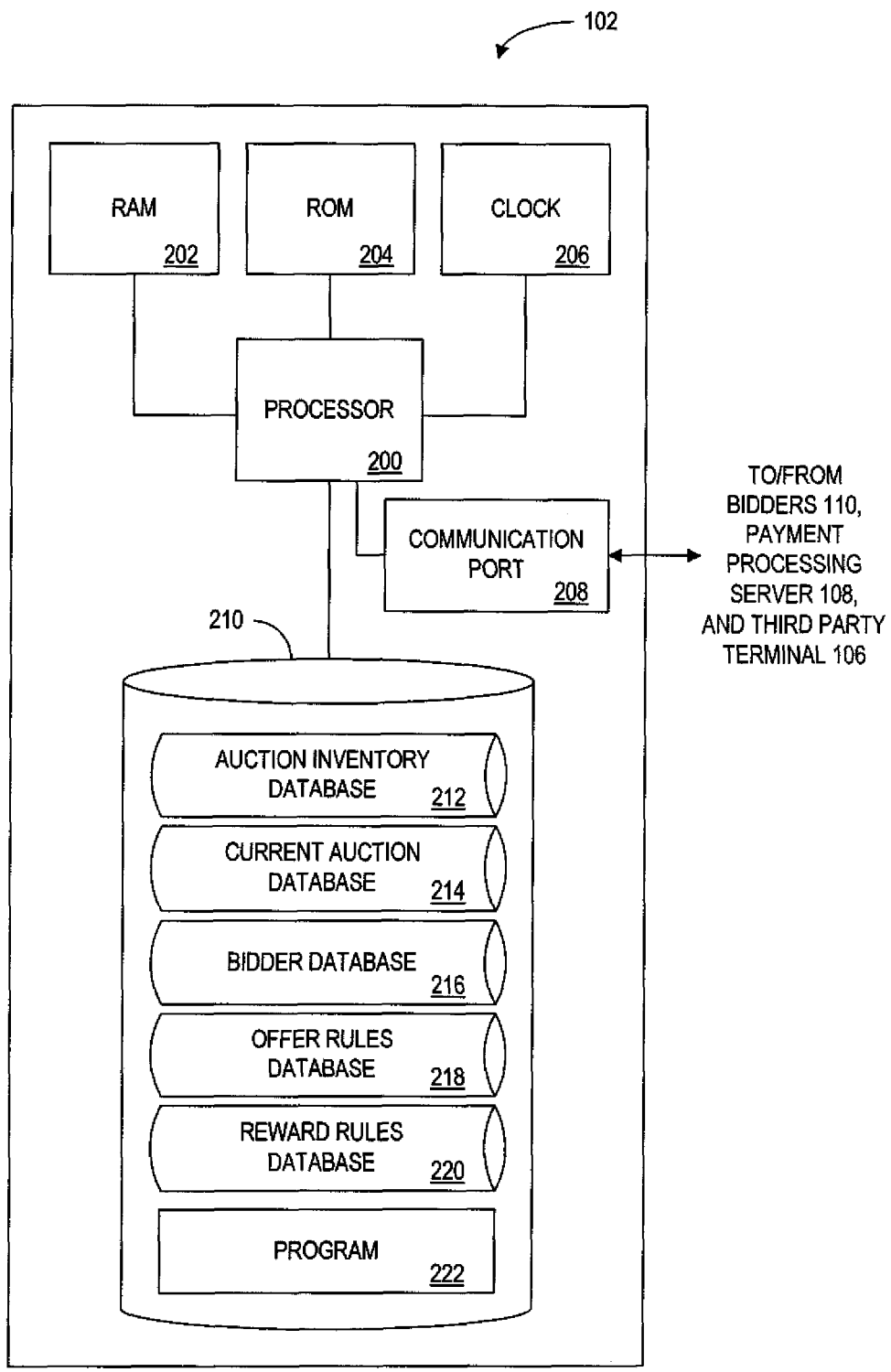
FIG. 2 is a block diagram illustrating the components of an auction server depicted in FIG. 1.

FIG. 2 displays the components of auction server 102. These components include processor 200, random access memory (RAM) 202, read-only memory (ROM) 204, clock 206, communication port 208 and data storage device 210. Data storage device 210 stores auction inventory database 212, current auction database 214, bidder database 216, offer rules database 218, reward rules database 220 and program 222, discussed with reference to FIGS. 3-7 below.

Processor 200 may be any commonly manufactured microprocessor chip, such as the Pentium II® manufactured by Intel Corporation. Processor 200 runs at a clock speed (typically measured in megahertz (MHz)) determined by clock 206. Clock 206 may further be operative to measure the passage of time in order to calculate a current time in which the auction server 102 is operating.

Processor 200 is operatively connected to random access memory (RAM) 202 and read-only memory (ROM) 204. RAM 202, which may be one or more single inline memory module (SIMM) chips capable of storing a predetermined amount of data (typically measured in megabytes), is used by processor 200 for temporary storage of processing instructions during operation of auction server 102. Read-only memory (ROM) 204 is at least one permanent non-erasable and non-rewritable memory chip that stores initializing instructions to be used by processor 200 during, for example, a start-up routine performed by auction server 102. Further functions of random access memory (RAM) 202 and read-only memory (ROM) 204 will be apparent to one of ordinary skill in the art.

Processor 200 is further operatively connected to communication port 208, which may be one or more of the following commonly known computer peripherals used for computer-related communications: a parallel port, a serial port, a network card, a fax/modem/telephone port and/or any combination of the same. Communication port 208 is operatively connected to transfer data between processor 200 and network 104.

Processor 200 is further operatively connected to data storage device 210, which may be any one of the following commonly known computer peripherals used for storing computer data: a hard drive, a floppy disk drive, a DVD drive such as those manufactured by Phillips Electronics, a ZIP drive such as those manufactured by IOMEGA, a tape drive, a Digital Audio Tape drive and/or any combination of the same. Further such devices will be apparent to one of ordinary skill in the art. Data storage device 210 may be further operative to store an operating system, one or more application programs, or a web site run off of auction server 102 each exemplified through program 222, in order to successfully operate auction server 102 in accordance with the system and method of the present invention.

Figure 3:
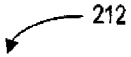
FIG. 3 depicts an exemplary auction inventory database stored in the auction server of FIG. 1.

FIG. 3 illustrates exemplary fields and data stored therein for auction inventory database 212. These exemplary fields include auction identification (ID) field 300, auctioned item field 302, open time/date field 303, close time/date field 304 and minimum starting bid field 306. For each record (e.g. each row) of auction inventory database 212, auction ID field 300 lists an auction identifier assigned by the operator of auction server 102 to each auction to be conducted. The auction identifier may be any alphabetic, numeric, alphanumeric or other type of code, assigned so that each auction conducted on auction server 102 has a unique identifier. For example, the numbers "123" and "124" have been assigned to two such auctions, as listed in FIG. 3. The data in auction ID field 300 corresponds to similar data stored in auction ID field 400 and auction ID field 600 discussed below with reference to FIGS. 4 and 6, respectively.

Auctioned item field 302 contains, for each record of auction inventory database 212, a listing of the item that is to be placed for bidding in the auction identified by the corresponding auction identifier. The auctioned item may be a product or a service. Products may be any tangible item of which the high bidder may take possession, for example, an automobile, furniture, clothing, antiquities and the like. Services may be any intangible item to which the high bidder is entitled, such as a magazine subscription or house cleaning services. In the example offered by FIG. 3, "product X" is to be placed for bid in auction "123" and "product Y" is to be placed for bid in auction "124."

Open time/date field 303 contains the date and time at which the corresponding auction is to be opened for bidding. In the example offered by FIG. 3, auction "123" is to be opened at 9:00 AM on Jan. 1, 1999. Likewise, close time/date field 304 contains the date and time at which the corresponding auction is to be closed (e.g. when no further bids will be accepted). In the example offered by FIG. 3, auction "124" is to be closed at 12:00 PM on Jan. 1, 1999. In one embodiment of the present invention, the data stored in close time/date field 304 for a particular auction may be changed based on the submission of a request and, preferably, a payment by a bidder to either extend the auction past the listed closing time or to close the auction early. The payment amount may be determined by the auctioneer, or may be subject to a parallel auction in which one or more bidders bid for a price for which the original auction will be closed.

Minimum starting bid field 306 contains, for each record, data corresponding to the minimum value that will be accepted for an auctioned item. For example, in auction "123," the minimum bid that will be accepted for "product X" is $125.00

FIG. 4 illustrates exemplary fields and the data stored therein for current auction database 214. Each record in current auction database 214 corresponds to a bid submitted by a bidder during an auction. The exemplary fields of this database include auction identification (ID) field 400, bidder identification (ID) field 402, bid amount field 404 and time received field 406. Auction ID field 400 contains data corresponding to the data stored in auction ID field 300. In the present example, only data for current auction number "123" is displayed. However, current auction database 214 may contain data for one or more previous auctions and/or one or more auctions conducted simultaneously. In the alternative, there may be one or more such current auction databases stored in data storage device 120, each containing archived, historical data corresponding to a previous auction or current data corresponding to a current auction.

Bidder identification (ID) field 402 contains, for each record, a unique code corresponding to a bidder participating in a corresponding auction. The bidder identification code may be any alphabetic, numeric, alpha-numeric or other type of code, assigned by the auctioneer so that each bidder participating in an auction on auction server 102 has a unique identifier. In the present example, one bidder participating in auction "123" has the bidder identification "MALWG018," as displayed in the first record of current auction database 214. Each code stored in bidder ID field 402 corresponds to a similar code stored in bidder identification (ID) field 500 of bidder database 216, discussed in conjunction with FIG. 5 below.

Bid amount field 404 lists the currency value submitted as a bid by a bidder for an auctioned item. For example, the first record of auction database 214 shows that for auction number "123" bidder MALWG018B submitted a bid of $450.00 for "product X."

Likewise, time received field 406 lists the date and time at which a bid was submitted. The data in time received field 406 may be recorded by auction server 102 as the bid is received after being transmitted by bidder terminal 110 over network 104. Alternatively, the time and date information may be encrypted by the bidder and transmitted along with the bid to auction server 102. In this manner, if there is a network disruption or if auction server 102 temporarily stops operating, the bid may still be accepted based on the encrypted date and time, even if the bid was actually received after the scheduled closing time. Upon receipt of the encrypted information, auction server 102 may containing processing instructions in program 222 to decrypt the encrypted information prior to storage in database 214. Schemes used for encrypting and decrypting are well-known to one of ordinary skill in the art. See, for example, Bruce Schneier, Applied Cryptography: Protocols, Algorithms, and Source Code in C (2d Ed., John Wiley & Sons, Inc., 1996).

FIG. 5 illustrates exemplary fields and the data stored therein for bidder database 216. Bidder database 216 generally stores data specific to each bidder registered to participate in an auction conducted on auction server 102. The exemplary fields of this database include bidder identification (ID) field 500, historic participation level field 502, bidder name field 504, financial account identifier field 506 and contact information field 508.

Bidder identification (ID) field 500 preferably contains a unique identifier for each bidder that has registered to participate in auctions conducted on auction server 102. The data stored in bidder ID field 500 is further preferably assigned by the operator of auction server 102 to uniquely identify each individual that has registered to submit bids. Alternatively, the bidder identifier may be determined by the bidder. The data may be any alphabetic, numeric, alpha-numeric or other code as discussed above with regard to bidder ID field 402.

Historic participation level field 502 contains a value determined by auction server 102 or an operator of auction server 102. This value acts as a rating for the bidder. The value may be determined from the bidder's previous bidding activities on auction server 102. For example, the value may correspond to the number of previous auctions in which the bidder submitted a greatest bid, the number of previous auctions in which the bidder submitted a competitive bid or some combination of the two. Other factors may be used to determine the values historic participation level field 502.

Bidder name field 504 contains the name of the bidder corresponding to the bidder identifier. In the present example, the first record of bidder database 216 indicates the "John Doe" has been assigned bidder identifier DOEQ29J.

Financial account identifier field 506 contains data corresponding to a financial account number, such as a credit card account number or a checking account number, from which a value of a bid submitted by the bidder is to be deducted. In the present example, the first record of bidder database 216 indicates that John Doe owns an account corresponding to financial account identifier number 1234-1234-1234-1234. Other data, such as a bank or credit card company identifier and an expiration date of the financial account may be included in this field, or may be stored in another field (not shown). The information stored in financial account identifier field 506 may further be used to credit a reward given to the bidder or to deduct a penalty charged to a bidder, discussed further below.

Contact information field 508 contains data preferably corresponding to a post office address for each bidder. The data may contain the bidders street address and city and state of residence. This information may be used as a delivery address for an auctioned item that a bidder has won. It may be further used in processing a transaction with a financial institution holding the financial account indicated in financial account identifier field 206. The transaction is preferably processed by auction server 102 in communication with payment processing server 108. Other data, such as a bidder's telephone number or e-mail address may be stored in contact information field 508 or in another field (not shown).

FIG. 6 illustrates exemplary fields and the data stored therein for offer rules database 218. Offer rules database 218 contains data accessed by auction server 102 during an auction to determine when a reward offer should be made to a bidder. The exemplary fields of this database include auction identification (ID) field 600, required conditions field 602, offer message field 604, offer recipient rules field 606 and Reward ID field 608.

Auction identification (ID) field 600 contains data corresponding to an auction identifier for an auction conducted on auction server 102. The auction identifier is determined as discussed above with respect to auction ID field 300 and auction ID field 400.

Required conditions field 602 contains, for each record, one or more conditions that must be met in order for a reward offer to be made to a bidder who submitted a bid during an auction. As indicated in FIG. 6, such conditions may require, for example, that (i) no bid has been received during a current auction for over 30 minutes, (ii) the high bid in a current auction is less than $300.00 after the third hour of such auction and/or (iii) the high bid submitted during a current auction is less than $450.00. Other such conditions in which offers are made to bidders in order to encourage competitive bidding may be determined by the auctioneer and stored in required conditions field 602.

Offer message field 604 contains data corresponding to text that will be transmitted to a qualified bidder participating in a current auction if the corresponding condition is met. The text preferably lists the reward to be given during the current offer and the action the bidder must take to earn the reward.

Offer recipient rules field 606 lists the bidders to whom the offer message in corresponding offer message field 604 will be transmitted if the corresponding condition is met. The offer recipient rules may be established by the auctioneer, the owner of the auctioned product or a third party who is offering the reward.

Reward identifier field 608 contains a reward identifier corresponding to a reward to be given to a bidder if the bidder accepts the offer for the reward. The data in reward identifier field 608 is established in a similar fashion to the data stored in reward identifier field 700, discussed below with regard to FIG. 7.

FIG. 7 illustrates exemplary fields and the data stored therein for reward rules database 220. Reward rules database 220 contains data accessed by auction server 102 during an auction to determine when a reward should be provided to a bidder. The exemplary fields of this database include reward identifier field 700, reward supplier field 702, reward description field 704 and reward rules field 706.

Reward identifier field 700 contains a reward identifier corresponding to a reward to be given to a bidder for a bid submitted during an auction. The reward identifier may be any alphabetic, numeric, alphanumeric, or other code which preferably is uniquely assigned 102 to each category of rewards by the auctioneer or auction server.

Reward supplier field 702 lists, for each reward identifier, the party who is supplying the reward. Typically the reward may be supplied by the auctioneer. However, in one embodiment of the present invention, the reward supplier may be a third party, such as a credit card company, who may supply the reward automatically if the bidder agrees to file a credit card application with the company. In such an embodiment, the third party may first check the credit history of the bidder using information supplied by auction server 102 from bidder database 216 before making the offer. Examples of other third parties include (i) a telecommunications company who may offer to supplement the pecuniary value of a bidder's bid if the bidder agrees to switch her long distance telecommunications carrier to the third party or (ii) an insurance company who may offer a reward to a bidder if the bidder agrees to purchase insurance from the company. Rewards supplied by third parties may include a value of currency, a supplement to the bid, a rebate on the product, an amount of frequent flier miles, a second product, a warranty for the product, free shipment of the product if the bid is the greatest bid, and the like. A supplement to the bid is an amount by which a bid is increased. For example, if a bid is for $50.00, and a supplement to that bid is $5.00, then the bid is increased to $55.00 with the supplement. The rewards offered by third parties may further be conditioned upon the bidder submitting the greatest bid.

Reward description field 704 contains a description of the reward to be given to a bidder. The reward may be any product, service or currency amount that the reward supplier sees fit to offer the bidder.

Reward rules field 706 contains a description of the one or more rules that must be met before a bidder may automatically receive the reward. These rules are preferably established by the auctioneer, but may be established by the reward supplier or the owner of the auctioned product if different than the auctioneer. Once the rules have been met, the bidder will receive notification that he has earned the reward.

In addition, reward rules field 706 may further contain one or more rules in which a penalty will be assessed against a bidder. The penalty is provided in order to discourage non-competitive bidding behavior. An example of a rule in which a penalty will be provided is where the bidder submits a bid that is less than the minimum starting bid listed in minimum starting bid field 306 for the auction. Another example is where a bidder submits a bid that is lower than a previously submitted bid. Other examples will be apparent to one of ordinary skill in the art. Examples of penalties include, barring the bidder from submitting bids for a particular auction or for a predetermined amount of time, limiting the number of bids the bidder may submit, or charging the bidder's financial account for a predetermined currency amount.

Figure 8:
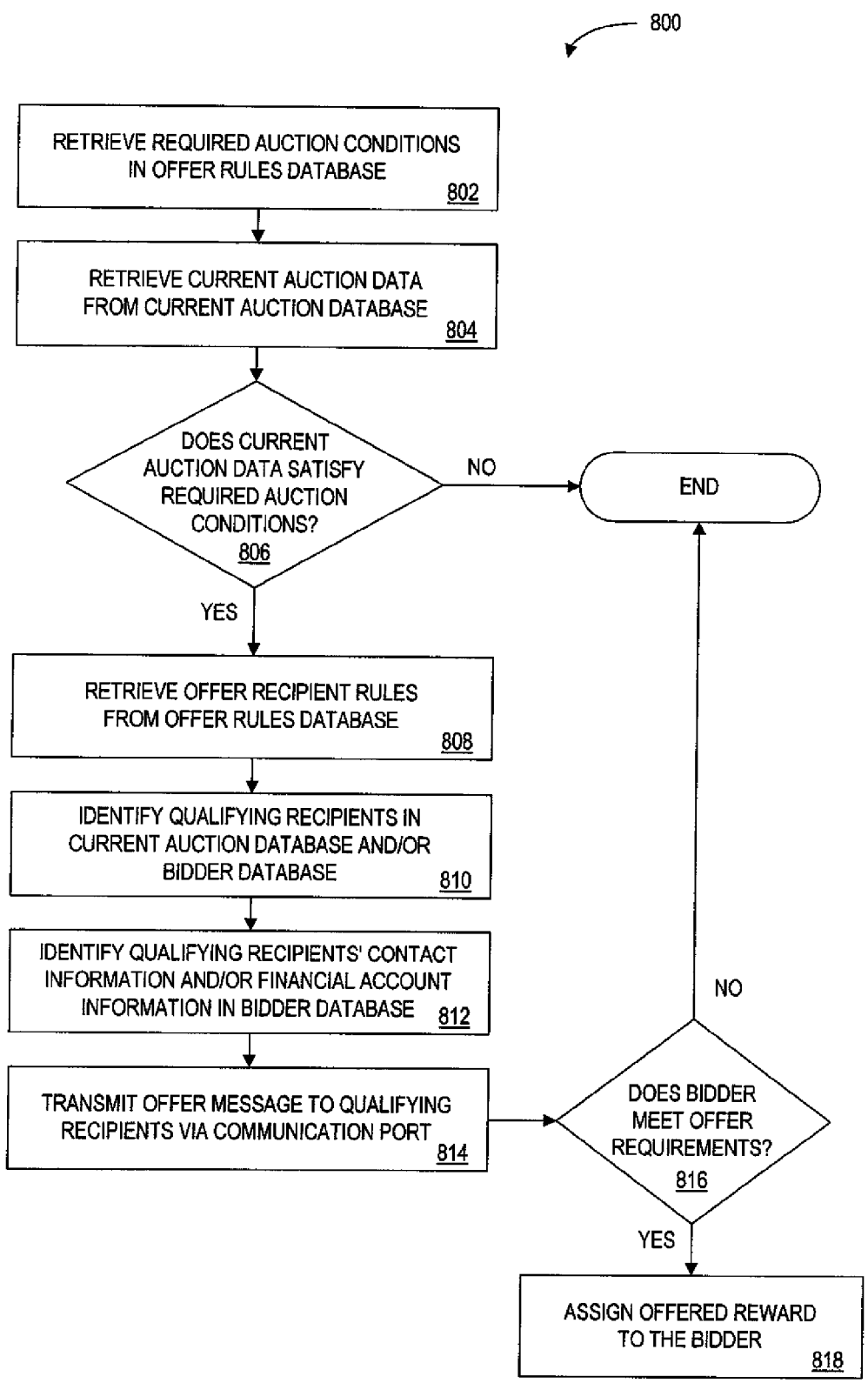
FIG. 8 is a flowchart illustrating the steps performed by the auction server of FIG. 1 during an exemplary offer determination process of the present invention.

Turning now to FIG. 8, reward offering process 800 is continuously performed during a given auction session by processor 200 in conjunction with processing instructions stored in program 222 of data storage device 210. Process 800 is further performed for each auction listed in auction ID field 600 that is conducted on auction server 102. Process 800 begins at step 802 where processor 200 is programmed to retrieve the required auction conditions listed in field 602 of database 218 for a current auction. At step 804, processor 200 retrieves the current auction data stored in fields 404 and 406 of current auction database 214. At step 806, processor 200 correlates the retrieved data and compares it to the required auction conditions. If the current auction data satisfies the required auction conditions, process 800 continues to step 808. Otherwise process 800 ends and is reset to step 802.

At step 808, processor 200 retrieves from offer recipient rules field 606 each offer recipient rule stored for the subject auction and for which the required conditions have been satisfied. At step 810, processor 200 determines, based on the retrieved rules, which of the bidders participating in the subject auction are to receive the corresponding offer message stored in offer message field 604. At step 812, the qualified bidders contact information and/or financial account identifier is retrieved by processor 200 from bidder database 216 when this information is necessary to send the offered reward to the bidder. At step 814, the corresponding offer message stored in offer message field 604 is transmitted to the qualified bidders from communication port 208 over network 104 to the qualified bidders terminals 110.

At step 816, processor 200 determines whether the offer was accepted by a bidder. If the offer is not accepted, process 800 ends and is reset to step 802. If the offer is accepted by a bidder, then at step 818, the reward is assigned to the bidder and is, for example, sent to the bidder's address, added to the bidder's next bid or credited to the bidder's financial account, depending on the type of reward. Process 800 then ends and is reset to step 802.

Figure 9:
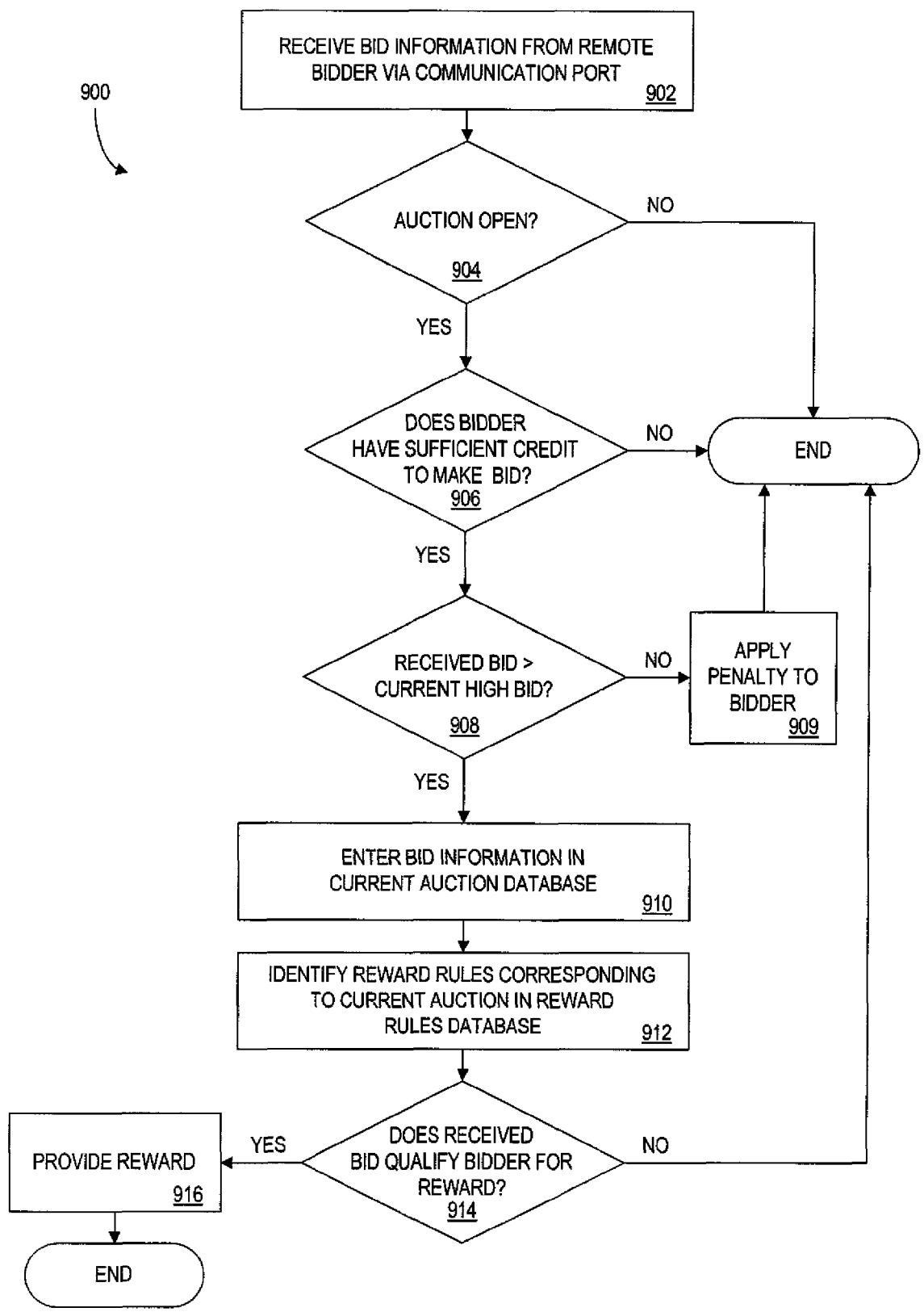
FIG. 9 is a flowchart illustrating the steps performed by the auction server of FIG. 1 in accordance with an exemplary reward process of the present invention.

Referring now to FIG. 9, a single bidder reward process 900 is continuously performed during a given auction session by processor 200 in conjunction with processing instructions stored in program 222 of data storage device 210. Process 900 may be performed during any or all auctions, as determined by the auctioneer to be appropriate.

Process 900 begins at step 902 when a bid is received from a bidder terminal 110, transmitted over network 104 and received via communication port 208. As described above, the bid information may contain a current auction identifier, the bidder identifier, a pecuniary value of the bid and, optionally, an encrypted date and time at which the bidder transmitted this information. After the bid information is stored in current auction database 214, the process continues to step 904 where processor 200 determines whether the auction for which the bid is submitted is open. This is accomplished by referencing the time stored from signals received from clock 206 and comparing the current time to the times stored in open date/time field 303 and close date/time field 304. If the auction is open the process continues to step 906, otherwise process 900 ends and is reset to step 902.

At step 906, processor 200 determines whether the bidder submitting the bid has sufficient funds or credit to pay the currency value of the bid. This is accomplished by retrieving the financial account identifier stored in field 506 which corresponds to the bidder identifier. Processor 200 then communicates with payment processing server 108 through communication port 208 and over network 104 to determine whether the financial account has sufficient funds to cover the bid amount. If the bidder has sufficient funds or credit, process 900 continues to step 908. Otherwise, process 900 ends and is reset to step 902. In an alternate embodiment, step 906 may be deferred until after the close of the auction Other methods for determining whether the bidder has sufficient funds will be understood by those skilled in the art.

At step 908, processor 200 determines, in accordance with at least one exemplary reward rule, whether the received bid is greater than the current high bid. Those skilled in the art will understand that the following illustrated method is likewise applicable to other types of reward rules. The determination is accomplished by retrieving all the bid values stored in bid amount field 404 of current auction database 214 and comparing them to the received bid. If the received bid is less than the current high bid, process 900 optionally continues to step 909 where a penalty may be applied against the bidder, after which process 900 ends and is reset to step 902. If, however, the received bid is greater than the current high bid, then the exemplary reward rule has been met and process 900 continues to step 910.

It should be apparent to one of ordinary skill in the art that various additional or substitute reward rules may be applied at step 908. For example, instead of a reward rule that requires that the received bid is greater than a current high bid, the auctioneer may provide for such alternate reward rules as: (i) the bidder submits a bid within a predetermined time from the submission of a previous bid, (ii) the bidder must submit greater than a predetermined number of increasing bids during the course of the auction (e.g. each of the bidder's bids is greater than the former), (iii) the bidder's bid must be greater than any previous bid by at least a predetermined bid spread, (iv) the greatest bid for the auction must be greater than $500.00, (v) the bidder must have participated in greater than a predetermined number of previous auctions, (vi) the bid is submitted after a predetermined amount of time from a previous bid, (vii) random bidders may be selected to receive a reward. Other such conditions will be apparent and are contemplated to be within the scope of the present invention.

At step 910, the bid information is stored in the appropriate fields of current auction database 214. Then, at step 912, processor 200 retrieves the reward rules corresponding to the current auction as stored in reward rules field 706 of reward rules database 220. At step 914, processor 200 compares the received bid to the reward rules to determine if the bidder is qualified to receive a reward based on her bid. If so, process 900 continues to step 916 where the reward is provided to the bidder, after which process 900 ends and is reset to step 902. If not, process 900 is likewise ended and reset to step 902.

Figure 10A:
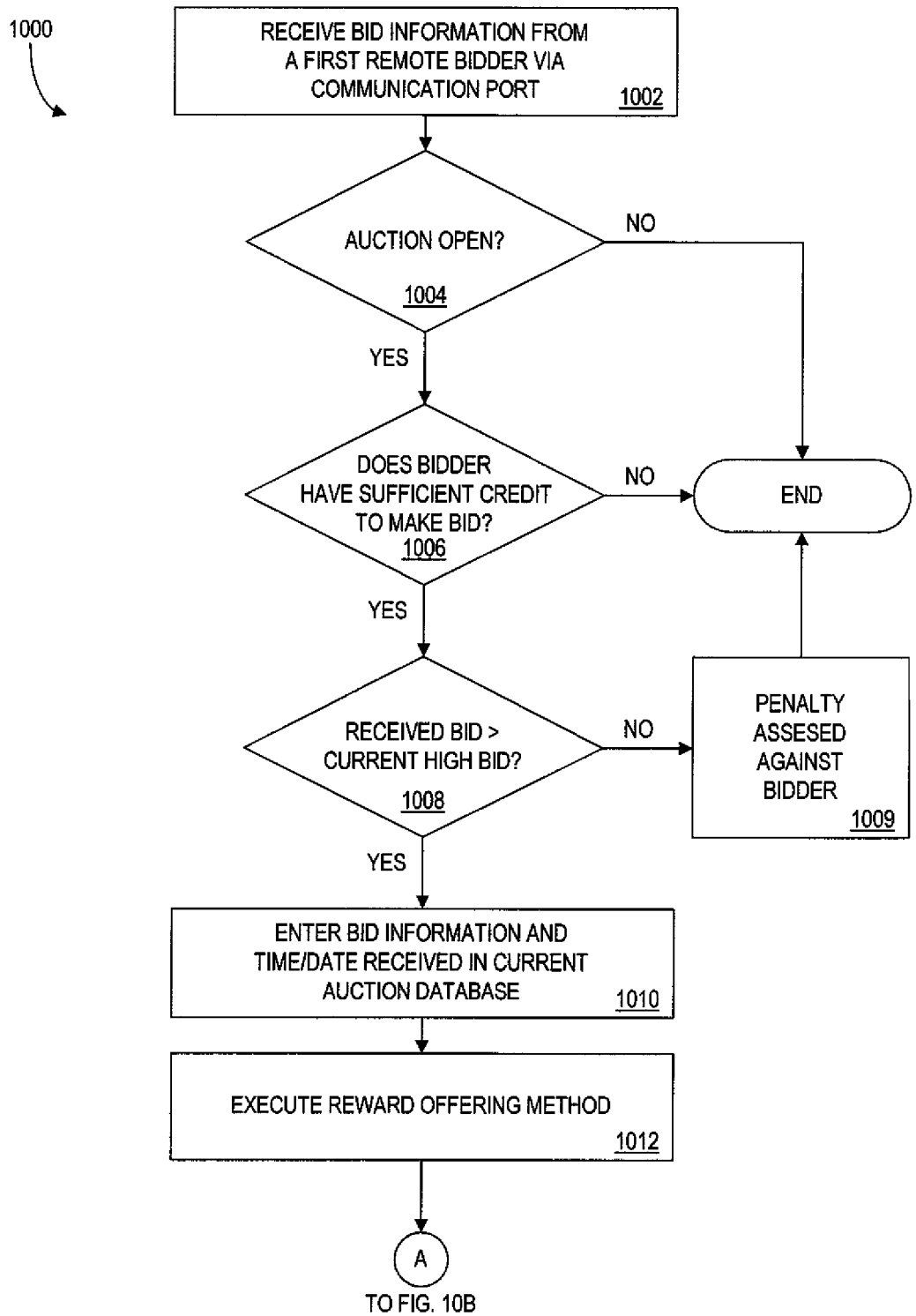
FIGS. 10A-10B are a flow chart illustrating the steps performed by the auction server of FIG. 1 in accordance with an exemplary multiple bidder reward process of the present invention.
Figure 10B:
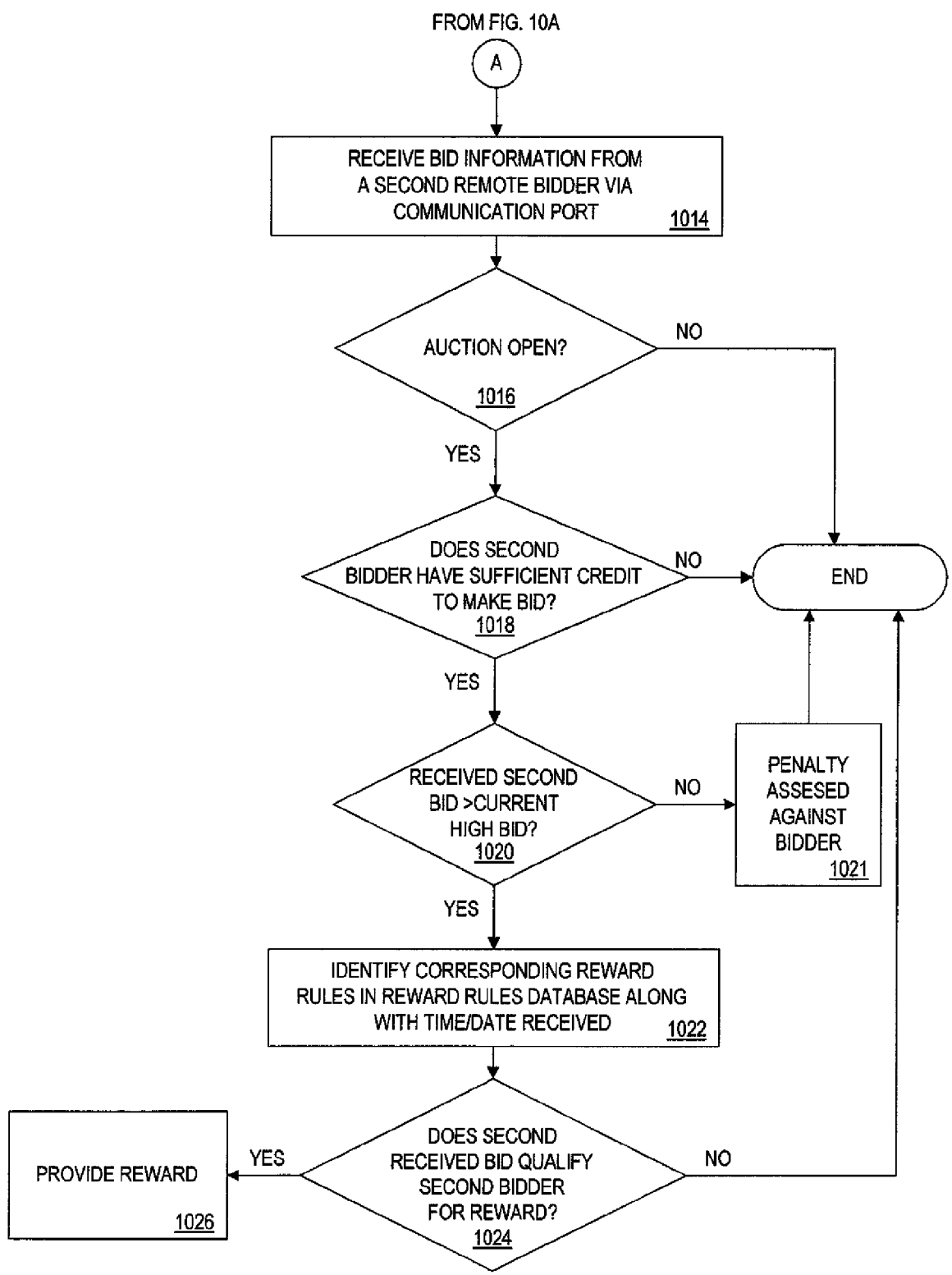

Referring now to FIGS. 10A-10B, a multiple bidder reward process 1000 is performed by processor 200 in conjunction with processing instructions stored in program 222 of data storage device 210. Process 1000 may be performed during any or all auctions as determined by the auctioneer to be appropriate.

Process 1000 begins at step 1002 when a bid is received from a bidder terminal, transmitted over network 104 and received via communication port 208. As described above, the bid information may contain a current auction identifier, the bidder identifier, a pecuniary value of the bid and, optionally, an encrypted date and time at which the bidder transmitted this information. After the bid information is stored in current auction database 214, the process continues to step 1004 where processor 200 determines whether the auction for which the bid is submitted is open. This is accomplished by referencing the current time determined from signals received from clock 206 and comparing the current time to the times stored in open date/time field 303 and close date/time field 304. If the auction is open the process continues to step 1006, otherwise process 1000 ends and is reset to step 1002.

At step 1006, processor 200 determines whether the bidder submitting the bid has sufficient funds or credit to pay the currency value of the bid. This is accomplished by retrieving the financial account identifier stored in field 506 which corresponds to the bidder identifier. Processor 200 then communicates with payment processing server 108 through communication port 208 and over network 104 to determine whether the financial account has sufficient funds to cover the bid amount. If the bidder has sufficient funds or credit, process 1000 continues to step 1008. Otherwise, process 1000 ends and is reset to step 1002.

At step 1008, processor 200 determines, in accordance with an exemplary reward rule, whether the received bid is greater than the current high bid. This is accomplished by retrieving all the bid values stored in bid amount field 404 of current auction database 214 and comparing them to the received bid. If the received bid is less than or equal to the current high bid, process 1000 continues to step 1009 where a penalty may be assessed against the bidder, after which process 1000 ends and is reset to step 1002. If, however, the received bid is greater than the current high bid, process 1000 continues to step 1010.

As discussed above with regard to step 908, the reward rule employed at step 1008 is merely exemplary. Additional or alternate reward rules may be employed.

At step 1010, the bid information is stored in the appropriate fields of current auction database 214. Processor 200 then compares the bid against the reward rules stored in reward rules field 706 of reward rules database 220. If the bid satisfies the conditions of one or more of the reward rules, the bidder is given the reward at step 1012, and process 1000 continues to step 1014.

At step 1014, a bid from a second (or subsequent) bidder terminal is transmitted over network 104 and received via communication port 208. As described above, the bid information may contain a current auction identifier, the bidder identifier, a pecuniary value of the bid and, optionally, an encrypted date and time at which the bidder transmitted this information. After the bid information is stored in current auction database 214, the process continues to step 1016 where processor 200 determines whether the auction for which the bid is submitted is open. This is accomplished by referencing the current time determined from signals received from clock 206 and comparing the current time to the times stored in open date/time field 303 and close date/time field 304. If the auction is open the process continues to step 1018, otherwise process 1000 ends and is reset to step 1002.

At step 1018, processor 200 determines whether the second bidder submitting the second bid has sufficient finds or credit to pay the currency value of the bid. This is accomplished by retrieving the financial account identifier stored in field 506 which corresponds to the second bidder identifier. Processor 200 then communicates with payment processing server 108 through communication port 208 and over network 104 to determine whether the financial account has sufficient funds to cover the bid amount. If the second bidder has sufficient funds or credit, process 1000 continues to step 1020. Otherwise, process 1000 ends and is reset to step 1002.

At step 1020, processor 200 determines, based on an exemplary reward rule, whether the second received bid is greater than the current high bid. This is accomplished by retrieving all the bid values stored in bid amount field 404 of current auction database 214 and comparing them to the second received bid. If the second received bid is less than or equal to the current high bid, process 1000 continues to step 1021 where a penalty may be assessed against the second bidder, after which process 1000 ends and is reset to step 1002. If, however, the second received bid is greater than the current high bid, process 1000 continues to step 1022.

As discussed above with regard to steps 908 and 1008, the reward rule employed at step 1020 is merely exemplary. Additional or alternate reward rules may be employed.

At step 1022, the bid information is stored in the appropriate fields of current auction database 214. Processor 200 also retrieves corresponding reward rules from reward rules database 220. At step 1024, processor 200 then compares the second bid against the retrieved reward rules. If the second bid does not satisfy the reward rules, process 1000 ends and is reset to step 1002. However, if the second bid satisfies the conditions of one or more of the reward rules, the bidder is given the reward at step 1026, after which process 1000 ends. In an alternate embodiment, the reward assigned to the first bidder may be revoked as part of step 1026.

While the best mode contemplated for carrying out the invention has been described in detail in the foregoing, those of ordinary skill in the art to which the instant invention relates will recognize various alternative designs and embodiments for practicing the invention. In particular, the methods and systems disclosed above, though discussed in terms of an on-line embodiment, are equally applicable to enhance competitive bidding in any conventional form of auctioning. Furthermore, the databases and data stored therein may be rearranged or combined into equivalent structures. Finally, it is to be understood that a reward may be provided during a current auction or may be awarded subsequent to the current auction. Accordingly, it is to be understood that the foregoing description is provided for illustrative purposes only and does not limit the scope of the instant invention, as defined by the appended claims.

We claim:

1. A method, comprising:
   identifying, by an auction server, a product subject to bidding during an auction session;
   receiving, by the auction server, a bid for the product from a bidder;
   determining, by the auction server, based at least on a reward rule that includes a requirement that the bidder accept a reward supplied by a third party, that the bidder is qualified to receive a reward offer; and
   providing the reward offer to the bidder.

2. The method of claim 1, further comprising:
   receiving, by the auction server, an indication from the bidder of acceptance of the requirement; and
   providing a reward associated with the reward offer to the bidder.

3. The method of claim 2, wherein the reward comprises at least one of a value of currency, or a second product.

4. The method of claim 2, wherein the reward comprises at least one of a warranty for the product or free shipping of the product.

5. The method of claim 2, wherein the reward comprises a supplement to a second bid of the bidder.

6. The method of claim 5, wherein the supplement comprises an amount of frequent flier miles.

7. The method of claim 5, wherein the supplement comprises a value of currency.

8. The method of claim 1, further comprising automatically providing a reward associated with the reward offer to the bidder.

9. The method of claim 8, wherein the reward comprises at least one of a value of currency, or a second product.

10. The method of claim 8, wherein the reward comprises at least one of a warranty for the product or free shipping of the product.

11. The method of claim 8, wherein the reward comprises a supplement to a second bid of the bidder.

12. The method of claim 11, wherein the supplement comprises an amount of frequent flier miles.

13. The method of claim 11, wherein the supplement comprises a value of currency.

14. The method of claim 1, further comprising, prior to receiving the bid, providing a description of the at least one reward rule.

15. A computer readable medium storing instructions configured to direct a processor to:
   identify a product subject to bidding during an auction session;
   receive a bid for the product from a bidder;
   determine, based at least on a reward rule that includes a requirement that the bidder accept a reward supplied by a third party, that the bidder is qualified to receive a reward offer; and
   provide the reward offer to the bidder.

16. The computer readable medium of claim 15, further comprising instructions configured to direct the processor to:
   receive an indication from the bidder of acceptance of the requirement; and
   provide a reward associated with the reward offer to the bidder.

17. The computer readable medium of claim 16, in which the instructions for providing the reward comprise instructions configured to direct the processor to provide at least one of a value of currency, or a second product.

18. The computer readable medium of claim 16, in which the instructions for providing the reward comprise instructions configured to direct the processor to provide at least one of a warranty for the product or free shipping of the product.

19. The computer readable medium of claim 16, in which the instructions for providing the reward comprise instructions configured to direct the processor to provide a supplement to a second bid of the bidder.

20. The computer readable medium of claim 19, in which the instructions for providing the supplement to the second bid comprise instructions configured to direct the processor to provide an amount of frequent flier miles.

21. The computer readable medium of claim 19, in which the instructions for providing the supplement to the second bid comprise instructions configured to direct the processor to provide a value of currency.

22. The computer readable medium of claim 15, further comprising instructions configured to direct the processor to automatically provide a reward associated with the reward offer to the bidder.

23. The computer readable medium of claim 22, in which the instructions for providing the reward comprise instructions configured to direct the processor to provide at least one of a value of currency, or a second product.

24. The computer readable medium of claim 22, in which the instructions for providing the reward comprise instructions configured to direct the processor to provide at least one of a warranty for the product, or free shipping of the product.

25. The computer readable medium of claim 22, in which the instructions for providing the reward comprise instructions configured to direct the processor to provide a supplement to a second bid of the bidder.

26. The computer readable medium of claim 25, in which the instructions for providing the supplement to the second bid comprise instructions configured to direct the processor to provide an amount of frequent flier miles.

27. The computer readable medium of claim 25, in which the instructions for providing the supplement to the second bid comprise instructions configured to direct the processor to provide a value of currency.

28. The computer readable medium of claim 15, further comprising instructions configured to direct the processor to, prior to receiving the bid, provide a description of the at least one reward rule.

29. An apparatus of an auctioneer, comprising:
   a processor; and
   a storage device coupled to the processor, the storage device storing instructions configured to direct the processor to:
   identify a product subject to bidding during an auction session, the product being sold by an owner of the product;
   receive a bid for the product from a bidder;
   determine, based at least on a reward rule that includes a requirement that the bidder accept a reward supplied by a third party, that the bidder is qualified to receive a reward offer, wherein the third party comprises an entity different than the auctioneer, the owner of the product, and the bidder; and
   provide the reward offer to the bidder.

* * * * *